US008786730B2

(12) United States Patent
Tardif et al.

(10) Patent No.: US 8,786,730 B2
(45) Date of Patent: Jul. 22, 2014

(54) IMAGE EXPOSURE USING EXCLUSION REGIONS

(75) Inventors: John Tardif, Sammamish, WA (US); Seshagiri Panchapagesan, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 526 days.

(21) Appl. No.: 13/212,927

(22) Filed: Aug. 18, 2011

(65) Prior Publication Data

US 2013/0044222 A1 Feb. 21, 2013

(51) Int. Cl.
*H04N 5/235* (2006.01)
*H04N 5/232* (2006.01)

(52) U.S. Cl.
USPC ........ 348/229.1; 348/345; 348/187; 396/217; 396/224

(58) Field of Classification Search
CPC ... H04N 5/243; H04N 5/2176; H04N 5/2178; H04N 5/2356
USPC .......... 348/187, 229.1, 255, 208.12, 345, 362
See application file for complete search history.

(56) References Cited

U.S. PATENT DOCUMENTS

| | | |
|---|---|---|
| 4,627,620 A | 12/1986 | Yang |
| 4,630,910 A | 12/1986 | Ross et al. |
| 4,645,458 A | 2/1987 | Williams |
| 4,695,953 A | 9/1987 | Blair et al. |
| 4,702,475 A | 10/1987 | Elstein et al. |
| 4,711,543 A | 12/1987 | Blair et al. |
| 4,751,642 A | 6/1988 | Silva et al. |
| 4,796,997 A | 1/1989 | Svetkoff et al. |
| 4,809,065 A | 2/1989 | Harris et al. |
| 4,817,950 A | 4/1989 | Goo |
| 4,843,568 A | 6/1989 | Krueger et al. |
| 4,893,183 A | 1/1990 | Nayar |
| 4,901,362 A | 2/1990 | Terzian |
| 4,925,189 A | 5/1990 | Braeunig |
| 5,053,808 A * | 10/1991 | Takagi ........................... 355/38 |
| 5,101,444 A | 3/1992 | Wilson et al. |

(Continued)

FOREIGN PATENT DOCUMENTS

| | | |
|---|---|---|
| CN | 201254344 B | 6/2010 |
| EP | 0583061 A2 | 2/1994 |

(Continued)

OTHER PUBLICATIONS

Osadchy, et al., "Efficient detection under varying illumination conditions and image plane rotations", Retrieved at <<http://citeseerx.ist.psu.edu/viewdoc/download?doi=10.1.1.1.9897&rep=rep1&type=pdf>>, Computer Vision and Image Understanding 93, 2004, pp. 245-259.

(Continued)

*Primary Examiner* — Hung Lam
(74) *Attorney, Agent, or Firm* — Judy Yee; Micky Minhas; Alleman Hall McCoy Russell & Tuttle LLP

(57) ABSTRACT

Calculating a gain setting for a primary image sensor includes receiving a test-matrix of pixels from a test image sensor, and receiving a first-frame matrix of pixels from a primary image sensor. A gain setting is calculated for the primary image sensor using the first-frame matrix of pixels except those pixels imaging one or more exclusion regions identified from the test matrix of pixels.

20 Claims, 4 Drawing Sheets

(56) References Cited

U.S. PATENT DOCUMENTS

| | | |
|---|---|---|
| 5,148,154 A | 9/1992 | MacKay et al. |
| 5,184,295 A | 2/1993 | Mann |
| 5,229,754 A | 7/1993 | Aoki et al. |
| 5,229,756 A | 7/1993 | Kosugi et al. |
| 5,239,463 A | 8/1993 | Blair et al. |
| 5,239,464 A | 8/1993 | Blair et al. |
| 5,288,078 A | 2/1994 | Capper et al. |
| 5,295,491 A | 3/1994 | Gevins |
| 5,320,538 A | 6/1994 | Baum |
| 5,347,306 A | 9/1994 | Nitta |
| 5,385,519 A | 1/1995 | Hsu et al. |
| 5,405,152 A | 4/1995 | Katanics et al. |
| 5,417,210 A | 5/1995 | Funda et al. |
| 5,423,554 A | 6/1995 | Davis |
| 5,454,043 A | 9/1995 | Freeman |
| 5,469,740 A | 11/1995 | French et al. |
| 5,495,576 A | 2/1996 | Ritchey |
| 5,516,105 A | 5/1996 | Eisenbrey et al. |
| 5,524,637 A | 6/1996 | Erickson |
| 5,534,917 A | 7/1996 | MacDougall |
| 5,563,988 A | 10/1996 | Maes et al. |
| 5,577,981 A | 11/1996 | Jarvik |
| 5,580,249 A | 12/1996 | Jacobsen et al. |
| 5,594,469 A | 1/1997 | Freeman et al. |
| 5,597,309 A | 1/1997 | Riess |
| 5,616,078 A | 4/1997 | Oh |
| 5,617,312 A | 4/1997 | Iura et al. |
| 5,638,300 A | 6/1997 | Johnson |
| 5,641,288 A | 6/1997 | Zaenglein, Jr. |
| 5,682,196 A | 10/1997 | Freeman |
| 5,682,229 A | 10/1997 | Wangler |
| 5,690,582 A | 11/1997 | Ulrich et al. |
| 5,703,367 A | 12/1997 | Hashimoto et al. |
| 5,704,837 A | 1/1998 | Iwasaki et al. |
| 5,715,834 A | 2/1998 | Bergamasco et al. |
| 5,875,108 A | 2/1999 | Hoffberg et al. |
| 5,877,803 A | 3/1999 | Wee et al. |
| 5,913,727 A | 6/1999 | Ahdoot |
| 5,933,125 A | 8/1999 | Fernie |
| 5,980,256 A | 11/1999 | Carmein |
| 5,989,157 A | 11/1999 | Walton |
| 5,995,649 A | 11/1999 | Marugame |
| 6,005,548 A | 12/1999 | Latypov et al. |
| 6,009,210 A | 12/1999 | Kang |
| 6,054,991 A | 4/2000 | Crane et al. |
| 6,066,075 A | 5/2000 | Poulton |
| 6,072,494 A | 6/2000 | Nguyen |
| 6,073,489 A | 6/2000 | French et al. |
| 6,077,201 A | 6/2000 | Cheng et al. |
| 6,098,458 A | 8/2000 | French et al. |
| 6,100,896 A | 8/2000 | Strohecker et al. |
| 6,101,289 A | 8/2000 | Kellner |
| 6,128,003 A | 10/2000 | Smith et al. |
| 6,130,677 A | 10/2000 | Kunz |
| 6,141,463 A | 10/2000 | Covell et al. |
| 6,147,678 A | 11/2000 | Kumar et al. |
| 6,152,856 A | 11/2000 | Studor et al. |
| 6,159,100 A | 12/2000 | Smith |
| 6,173,066 B1 | 1/2001 | Peurach et al. |
| 6,181,343 B1 | 1/2001 | Lyons |
| 6,188,777 B1 | 2/2001 | Darrell et al. |
| 6,215,890 B1 | 4/2001 | Matsuo et al. |
| 6,215,898 B1 | 4/2001 | Woodfill et al. |
| 6,226,396 B1 | 5/2001 | Marugame |
| 6,229,913 B1 | 5/2001 | Nayar et al. |
| 6,256,033 B1 | 7/2001 | Nguyen |
| 6,256,400 B1 | 7/2001 | Takata et al. |
| 6,283,860 B1 | 9/2001 | Lyons et al. |
| 6,289,112 B1 | 9/2001 | Jain et al. |
| 6,299,308 B1 | 10/2001 | Voronka et al. |
| 6,308,565 B1 | 10/2001 | French et al. |
| 6,316,934 B1 | 11/2001 | Amorai-Moriya et al. |
| 6,363,160 B1 | 3/2002 | Bradski et al. |
| 6,384,819 B1 | 5/2002 | Hunter |
| 6,411,744 B1 | 6/2002 | Edwards |
| 6,430,997 B1 | 8/2002 | French et al. |
| 6,476,834 B1 | 11/2002 | Doval et al. |
| 6,496,598 B1 | 12/2002 | Harman |
| 6,503,195 B1 | 1/2003 | Keller et al. |
| 6,539,931 B2 | 4/2003 | Trajkovic et al. |
| 6,570,555 B1 | 5/2003 | Prevost et al. |
| 6,633,294 B1 | 10/2003 | Rosenthal et al. |
| 6,640,202 B1 | 10/2003 | Dietz et al. |
| 6,646,636 B1 | 11/2003 | Popovich et al. |
| 6,661,918 B1 | 12/2003 | Gordon et al. |
| 6,681,031 B2 | 1/2004 | Cohen et al. |
| 6,714,665 B1 | 3/2004 | Hanna et al. |
| 6,731,799 B1 | 5/2004 | Sun et al. |
| 6,738,066 B1 | 5/2004 | Nguyen |
| 6,765,726 B2 | 7/2004 | French et al. |
| 6,788,809 B1 | 9/2004 | Grzeszczuk et al. |
| 6,801,637 B2 | 10/2004 | Voronka et al. |
| 6,856,407 B2 | 2/2005 | Knighton et al. |
| 6,873,723 B1 | 3/2005 | Aucsmith et al. |
| 6,876,496 B2 | 4/2005 | French et al. |
| 6,937,742 B2 | 8/2005 | Roberts et al. |
| 6,950,534 B2 | 9/2005 | Cohen et al. |
| 7,003,134 B1 | 2/2006 | Covell et al. |
| 7,036,094 B1 | 4/2006 | Cohen et al. |
| 7,038,855 B2 | 5/2006 | French et al. |
| 7,039,676 B1 | 5/2006 | Day et al. |
| 7,042,440 B2 | 5/2006 | Pryor et al. |
| 7,050,606 B2 | 5/2006 | Paul et al. |
| 7,058,204 B2 | 6/2006 | Hildreth et al. |
| 7,060,957 B2 | 6/2006 | Lange et al. |
| 7,113,918 B1 | 9/2006 | Ahmad et al. |
| 7,121,946 B2 | 10/2006 | Paul et al. |
| 7,170,492 B2 | 1/2007 | Bell |
| 7,184,048 B2 | 2/2007 | Hunter |
| 7,202,898 B1 | 4/2007 | Braun et al. |
| 7,222,078 B2 | 5/2007 | Abelow |
| 7,227,526 B2 | 6/2007 | Hildreth et al. |
| 7,259,747 B2 | 8/2007 | Bell |
| 7,308,112 B2 | 12/2007 | Fujimura et al. |
| 7,317,836 B2 | 1/2008 | Fujimura et al. |
| 7,348,963 B2 * | 3/2008 | Bell ............................ 345/156 |
| 7,359,121 B2 | 4/2008 | French et al. |
| 7,367,887 B2 | 5/2008 | Watabe et al. |
| 7,379,563 B2 | 5/2008 | Shamaie |
| 7,379,566 B2 | 5/2008 | Hildreth |
| 7,389,591 B2 | 6/2008 | Jaiswal et al. |
| 7,412,077 B2 | 8/2008 | Li et al. |
| 7,421,093 B2 | 9/2008 | Hildreth et al. |
| 7,430,312 B2 | 9/2008 | Gu |
| 7,436,496 B2 | 10/2008 | Kawahito |
| 7,443,443 B2 | 10/2008 | Raskar et al. |
| 7,450,736 B2 | 11/2008 | Yang et al. |
| 7,452,275 B2 | 11/2008 | Kuraishi |
| 7,460,690 B2 | 12/2008 | Cohen et al. |
| 7,489,812 B2 | 2/2009 | Fox et al. |
| 7,536,032 B2 | 5/2009 | Bell |
| 7,555,142 B2 | 6/2009 | Hildreth et al. |
| 7,560,701 B2 | 7/2009 | Oggier et al. |
| 7,570,805 B2 | 8/2009 | Gu |
| 7,574,020 B2 | 8/2009 | Shamaie |
| 7,576,727 B2 | 8/2009 | Bell |
| 7,590,262 B2 | 9/2009 | Fujimura et al. |
| 7,593,552 B2 | 9/2009 | Higaki et al. |
| 7,595,825 B2 * | 9/2009 | Tsuruoka ..................... 348/241 |
| 7,598,942 B2 | 10/2009 | Underkoffler et al. |
| 7,607,509 B2 | 10/2009 | Schmiz et al. |
| 7,620,202 B2 | 11/2009 | Fujimura et al. |
| 7,668,340 B2 | 2/2010 | Cohen et al. |
| 7,680,298 B2 | 3/2010 | Roberts et al. |
| 7,683,954 B2 | 3/2010 | Ichikawa et al. |
| 7,684,592 B2 | 3/2010 | Paul et al. |
| 7,701,439 B2 | 4/2010 | Hillis et al. |
| 7,702,130 B2 | 4/2010 | Im et al. |
| 7,704,135 B2 | 4/2010 | Harrison, Jr. |
| 7,710,391 B2 | 5/2010 | Bell et al. |
| 7,729,530 B2 | 6/2010 | Antonov et al. |
| 7,746,345 B2 | 6/2010 | Hunter |
| 7,760,182 B2 | 7/2010 | Ahmad et al. |
| 7,809,167 B2 | 10/2010 | Bell |

(56) References Cited

U.S. PATENT DOCUMENTS

| | | | |
|---|---|---|---|
| 7,834,846 | B1 | 11/2010 | Bell |
| 7,852,262 | B2 | 12/2010 | Namineni et al. |
| RE42,256 | E | 3/2011 | Edwards |
| 7,898,522 | B2 | 3/2011 | Hildreth et al. |
| 8,035,612 | B2 | 10/2011 | Bell et al. |
| 8,035,614 | B2 | 10/2011 | Bell et al. |
| 8,035,624 | B2 | 10/2011 | Bell et al. |
| 8,072,470 | B2 | 12/2011 | Marks |
| 2002/0012053 | A1* | 1/2002 | Yoshida .................. 348/243 |
| 2005/0011959 | A1 | 1/2005 | Grosvenor |
| 2005/0024538 | A1 | 2/2005 | Park et al. |
| 2006/0290957 | A1* | 12/2006 | Kim et al. .................. 358/1.9 |
| 2008/0026838 | A1 | 1/2008 | Dunstan et al. |
| 2008/0041960 | A1 | 2/2008 | Kotlarsky et al. |
| 2009/0160815 | A1 | 6/2009 | Steer |
| 2011/0304541 | A1* | 12/2011 | Dalal ........................ 345/158 |

FOREIGN PATENT DOCUMENTS

| | | |
|---|---|---|
| JP | 08044490 A1 | 2/1996 |
| WO | 93/10708 A1 | 6/1993 |
| WO | 97/17598 A1 | 5/1997 |
| WO | 99/44698 A1 | 9/1999 |

OTHER PUBLICATIONS

Kanade et al., "A Stereo Machine for Video-rate Dense Depth Mapping and Its New Applications", IEEE Computer Society Conference on Computer Vision and Pattern Recognition, 1996, pp. 196-202,The Robotics Institute, Carnegie Mellon University, Pittsburgh, PA.

Miyagawa et al., "CCD-Based Range Finding Sensor", Oct. 1997, pp. 1648-1652, vol. 44 No. 10, IEEE Transactions on Electron Devices.

Rosenhahn et al., "Automatic Human Model Generation", 2005, pp. 41-48, University of Auckland (CITR), New Zealand.

Aggarwal et al., "Human Motion Analysis: A Review", IEEE Non-rigid and Articulated Motion Workshop, 1997, University of Texas at Austin, Austin, TX.

Shao et al., "An Open System Architecture for a Multimedia and Multimodal User Interface", Aug. 24, 1998, Japanese Society for Rehabilitation of Persons with Disabilities (JSRPD), Japan.

Kohler, "Special Topics of Gesture Recognition Applied in Intelligent Home Environments", in Proceedings of the Gesture Workshop, 1998, pp. 285-296, Germany.

Kohler, "Vision Based Remote Control in Intelligent Home Environments", University of Erlangen-Nuremberg/ Germany, 1996, pp. 147-154, Germany.

Kohler, "Technical Details and Ergonomical Aspects of Gesture Recognition applied in Intelligent Home Environments", 1997, Germany.

Hasegawa et al., "Human-Scale Haptic Interaction with a Reactive Virtual Human in a Real-Time Physics Simulator", Jul. 2006, vol. 4, No. 3, Article 6C, ACM Computers in Entertainment, New York, NY.

Qian et al., "A Gesture-Driven Multimodal Interactive Dance System", Jun. 2004, pp. 1579-1582, IEEE International Conference on Multimedia and Expo (ICME), Taipei, Taiwan.

Zhao, "Dressed Human Modeling, Detection, and Parts Localization", 2001, The Robotics Institute, Carnegie Mellon University, Pittsburgh, PA.

He, "Generation of Human Body Models", Apr. 2005, University of Auckland, New Zealand.

Isard et al., "CONDENSATION—Conditional Density Propagation for Visual Tracking", 1998, pp. 5-28, International Journal of Computer Vision 29(1), Netherlands.

Livingston, "Vision-based Tracking with Dynamic Structured Light for Video See-through Augmented Reality", 1998, University of North Carolina at Chapel Hill, North Carolina, USA.

Wren et al., "Pfinder: Real-Time Tracking of the Human Body", MIT Media Laboratory Perceptual Computing Section Technical Report No. 353, Jul. 1997, vol. 19, No. 7, pp. 780-785, IEEE Transactions on Pattern Analysis and Machine Intelligence, Caimbridge, MA.

Breen et al., "Interactive Occlusion and Collusion of Real and Virtual Objects in Augmented Reality", Technical Report ECRC-95-02, 1995, European Computer-Industry Research Center GmbH, Munich, Germany.

Freeman et al., "Television Control by Hand Gestures", Dec. 1994, Mitsubishi Electric Research Laboratories, TR94-24, Caimbridge, MA.

Hongo et al., "Focus of Attention for Face and Hand Gesture Recognition Using Multiple Cameras", Mar. 2000, pp. 156-161, 4th IEEE International Conference on Automatic Face and Gesture Recognition, Grenoble, France.

Pavlovic et al., "Visual Interpretation of Hand Gestures for Human-Computer Interaction: A Review", Jul. 1997, pp. 677-695, vol. 19, No. 7, IEEE Transactions on Pattern Analysis and Machine Intelligence.

Azarbayejani et al., "Visually Controlled Graphics", Jun. 1993, vol. 15, No. 6, IEEE Transactions on Pattern Analysis and Machine Intelligence.

Granieri et al., "Simulating Humans in VR", The British Computer Society, Oct. 1994, Academic Press.

Brogan et al., "Dynamically Simulated Characters in Virtual Environments", Sep./Oct. 1998, pp. 2-13, vol. 18, Issue 5, IEEE Computer Graphics and Applications.

Fisher et al., "Virtual Environment Display System", ACM Workshop on Interactive 3D Graphics, Oct. 1986, Chapel Hill, NC.

"Virtual High Anxiety", Tech Update, Aug. 1995, pp. 22.

Sheridan et al., "Virtual Reality Check", Technology Review, Oct. 1993, pp. 22-28, vol. 96, No. 7.

Stevens, "Flights into Virtual Reality Treating Real World Disorders", The Washington Post, Mar. 27, 1995, Science Psychology, 2 pages.

"Simulation and Training", 1994, Division Incorporated.

* cited by examiner

IMAGE EXPOSURE USING EXCLUSION REGIONS

BACKGROUND

Image sensors are used in a wide variety of devices. Electrical signals from image sensors may be amplified and processed to provide a visual representation of a scene. The magnitude of the amplification (gain setting) may affect the appearance of the image.

For example, if a scene to be imaged contains a bright region and a dark region, a gain setting may be calculated to provide a compromise between the appearance of the bright region and the dark region on the image. The dynamic range of the sensor (e.g., either the charge storage or the width of an analog to digital converter used to measure the charge) may be insufficient to capture the worst case dynamic range for a particular scene. As such, some regions of an image may not appear as desired.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

According to one aspect of this disclosure, calculating a gain setting for a primary image sensor includes receiving a test-matrix of pixels from a test image sensor, and receiving a first-frame matrix of pixels from a primary image sensor. A gain setting is calculated for the primary image sensor using the first-frame matrix of pixels except those pixels imaging one or more exclusion regions identified from the test matrix of pixels.

DETAILED DESCRIPTION

The present description is related to calculating an exposure setting for a primary image sensor, including but not limited to a visible-light digital camera sensor. An exposure setting may include any number of settings, such as a gain setting, aperture setting, or shutter speed, for example. As one example, a gain setting may be calculated in accordance with the present disclosure based on a subset of pixels which do not image one or more exclusion regions that are identified using a test image sensor, such as a depth camera.

Figure 1:
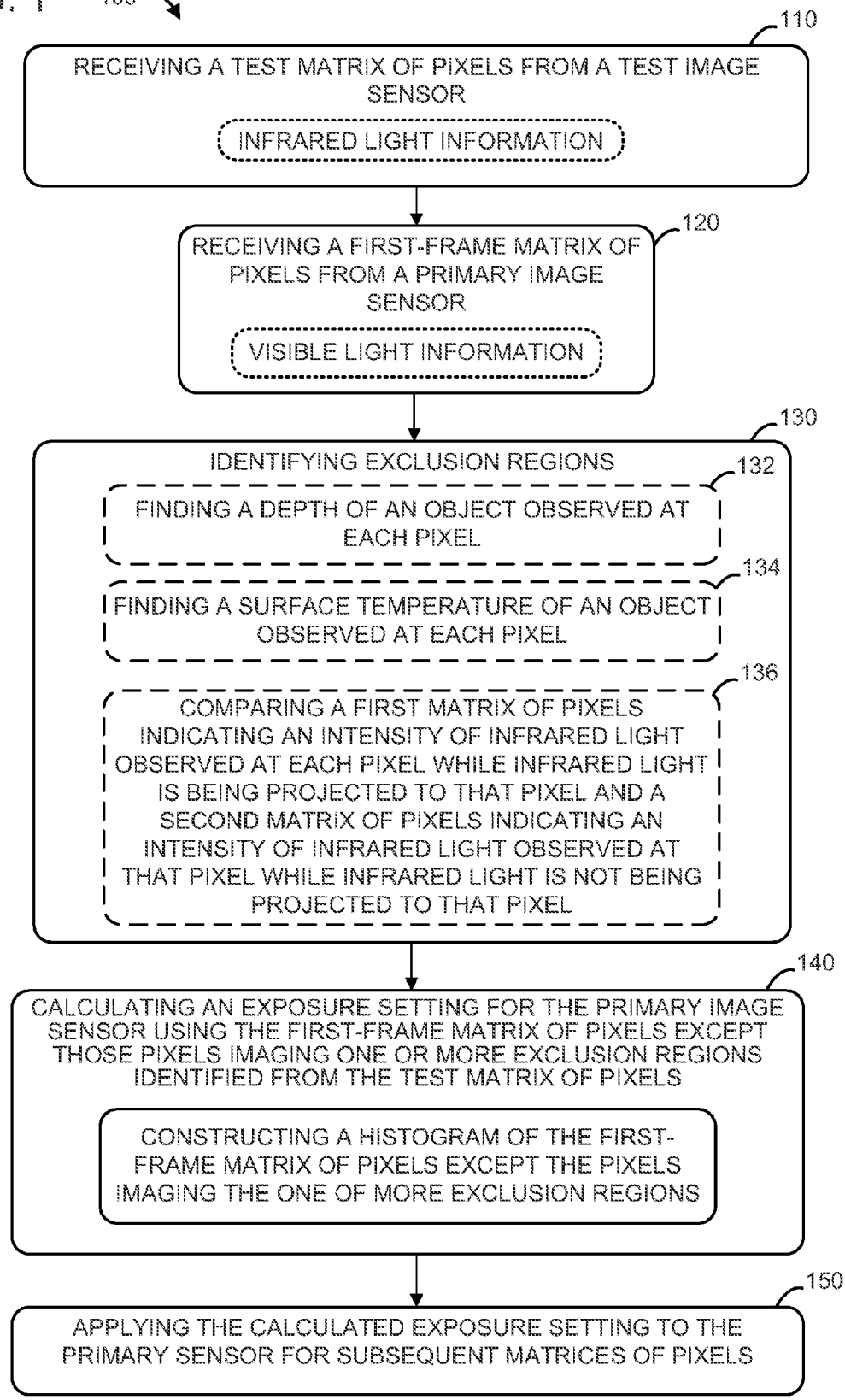
FIG. 1 shows an example method of calculating an exposure setting in accordance with an embodiment of the present disclosure.

FIG. 1 shows an embodiment of a method 100 of calculating an exposure setting for a primary image sensor. The primary image sensor may be used to generate a digital representation of a scene. Various types of primary image sensors may be used without departing from the scope of this disclosure. As nonlimiting examples, a charge-coupled device (CCD) or complementary metal-oxide-semiconductor (CMOS) image sensor may be used. The primary image sensor may be incorporated in virtually any device where light information is to be captured, such as gaming consoles, mobile devices, personal computers, and digital single lens reflex (DSLR) cameras, for example. The exposure setting may be a gain setting indicating a level of amplification of an electric signal, such as a current, a charge, or a voltage, for example.

At 110, the method 100 includes receiving a test matrix of pixels from a test image sensor. In some embodiments, the test image sensor is used to observe and output infrared light information in the form of a test matrix of pixels. Each pixel in the test matrix may include infrared light information indicating an intensity of infrared light observed at that pixel. However, in some embodiments the test image sensor may be a visible light image sensor, and each pixel in the test matrix may include visible light information indicating an intensity of visible light observed at that pixel.

The test matrix may be received from the test image sensor via any suitable communication channel. Wired or wireless connections may be used.

At 120, the method 100 includes receiving a first-frame matrix of pixels from a primary image sensor. The primary image sensor may be any sensor suitable for observing and outputting light information, such as a CCD or CMOS image sensor. In some embodiments, the primary image sensor is used to observe and output visible light information in the form of a first-frame matrix of pixels. In some embodiments, each pixel in the first-frame matrix includes visible light information indicating an intensity of visible light observed at that pixel. For example, each pixel may include an intensity value for each of one or more different color channels, The first-frame matrix of pixels, as well as the individual pixels, may be represented using any suitable data structure without departing from the scope of this disclosure.

The first-frame matrix may be received from the primary image sensor via any suitable communication channel. Wired or wireless connections may be used.

At 130, the method 100 includes identifying one or more exclusion regions imaged by a subset of the test matrix of pixels. Exclusion regions may include any portion of a scene that is not to be used for the purposes of calculating an exposure setting. As a nonlimiting example, a user may want to image an object in a scene which is backlit by a light source. The bright background of the scene may be identified as an exclusion region, and the exposure setting may be calculated without considering the bright background. Any suitable method and/or criteria may be utilized to identify exclusion regions.

For example, identifying exclusion regions may include finding a depth of an object observed at each pixel in the test matrix. The depth of an object may be found by using the test image sensor in a depth camera, for example. The depth camera may determine, for each pixel in the test matrix, the three dimensional depth of a surface in the scene relative to the depth camera. Virtually any depth finding technology may be used without departing from the scope of this disclosure (e.g., structured light, time-of-flight, stereo vision, etc.). When a depth camera is used, the three dimensional depth information determined for each pixel may be used to generate a depth image. Depth images may take the form of virtually any suitable data structure, including but not limited to, a matrix of pixels, where each pixel indicates a depth of an object observed at that pixel.

The pixel(s) from the depth image may be mapped to the corresponding pixel(s) from the primary image sensor in contemporaneous and/or subsequent frames. In this way, the depth of an object imaged by the primary image sensor may be determined. The exclusion regions may include a subset of pixels that image an object that is not within a threshold tolerance of a reference depth. For example, all pixels from the primary image sensor that image objects that are closer than a near-limit and/or are farther than a far-limit, as determined by the test matrix of pixels, may be effectively ignored for purposes of determining an exposure setting. As explained below, such exclusion regions may be applied to exposure calculations for one or more frames.

As another example, identifying exclusion regions may include finding a surface temperature of an object observed at each pixel. The test matrix may be used to determine the surface temperature. The surface temperature may be found via any number of techniques, such as using a look up table to correlate an intensity of infrared light to a surface temperature of an object.

The temperature(s) determined using the test matrix may be mapped to the pixel(s) from the primary image sensor. In this way, the surface temperature of an object imaged by the primary image sensor may be determined. The exclusion regions may include a subset of pixels that image an object that is not within a threshold tolerance of a reference surface temperature. For example, all pixels from the primary image sensor that image objects that are hotter than a high-limit and/or are cooler than a cool-limit, as determined by the test matrix of pixels, may be effectively ignored for one or more frames when determining an exposure setting. The cool-limit could be utilized when focusing on human subjects, and the high-limit could be utilized to ignore a lamp, for example As another example, identifying exclusion regions may include finding regions of high active and/or ambient light. As a nonlimiting example, high active and/or ambient light may be determined by projecting infrared light onto a scene and imaging the scene with a first matrix of pixels while the infrared light is being projected. The same scene can also be imaged with a second matrix of pixels when the infrared light is not being projected onto the scene. By comparing the images with and without the projected infrared light, active and/or ambient light can be identified. Any suitable comparison technique may be used, including but not limited to subtracting the first matrix from the second matrix.

By comparing these matrices, it may be determined which pixels in the first-frame matrix image regions of high ambient light. High ambient light regions may result from a lamp, the sun, or anything else adding light to one or more regions of a scene. The exclusion regions may include a particular pixel if the intensity of infrared light observed at that pixel while infrared light is being projected to that pixel is within a threshold tolerance of the intensity of infrared light observed at that pixel while infrared light is not being projected to that pixel. In other words, if the pixel images an area that is saturated with enough infrared light that the addition of projected infrared light does not cause a significant difference, that pixel can be included in an exclusion region.

While the above testing for ambient light was described with reference to projecting and imaging infrared light, it is to be understood that a similar technique may be used with visible light.

At 140, the method 100 may include calculating an exposure setting for the primary image sensor using the first-frame matrix of pixels except those pixels imaging one or more exclusion regions identified from the test matrix of pixels. For example, a histogram of the first-frame matrix of pixels except the pixels imaging the one or more exclusion regions may be constructed. The exposure setting may be calculated based on this histogram.

A gain setting or other exposure control may be adjusted so that a histogram of pixel intensities has a desired character. As an example, the exposure can be increased and/or decreased so that an average intensity, as represented by the histogram, is within a desired range. Because the histogram does not consider pixels from the exclusion regions, those pixels do not influence the adjustments. As a result, the adjustments are tuned to improve the exposure of the pixels that are not part of the exclusion regions. It should be appreciated that virtually any technique for calculating an exposure setting based on a histogram may be used without departing from the scope of this disclosure.

In this way, those pixels imaging exclusion regions may not be considered when calculating an exposure setting, and thus the exposure setting may provide a better image in regions of interest.

It is to be understood that the test matrix of pixels and the first-frame matrix of pixels may be sampled at different times relative to one another without departing from the scope of this disclosure. In some embodiments, the test matrix of pixels will be sampled prior to the first-frame matrix of pixels.

In some embodiments, the primary image sensor may provide sequential frames which collectively form a video representation of a scene. At 150, the method 100 may include applying the calculated exposure setting to the primary sensor for subsequent matrices of pixels. In other words, the exposure setting may be calculated at a fixed period, such as every frame, every other frame, after a fixed duration, every time the game console is powered on, and/or if a threshold change in lighting or scene composition is detected, for example.

The period may be dependent on whether or not the primary image sensor is substantially stationary. For example, for a fixed camera, if the user frequently eclipses a light source from the camera perspective, that region may always be excluded to avoid variability in the exposure/gain settings.

Figure 2:
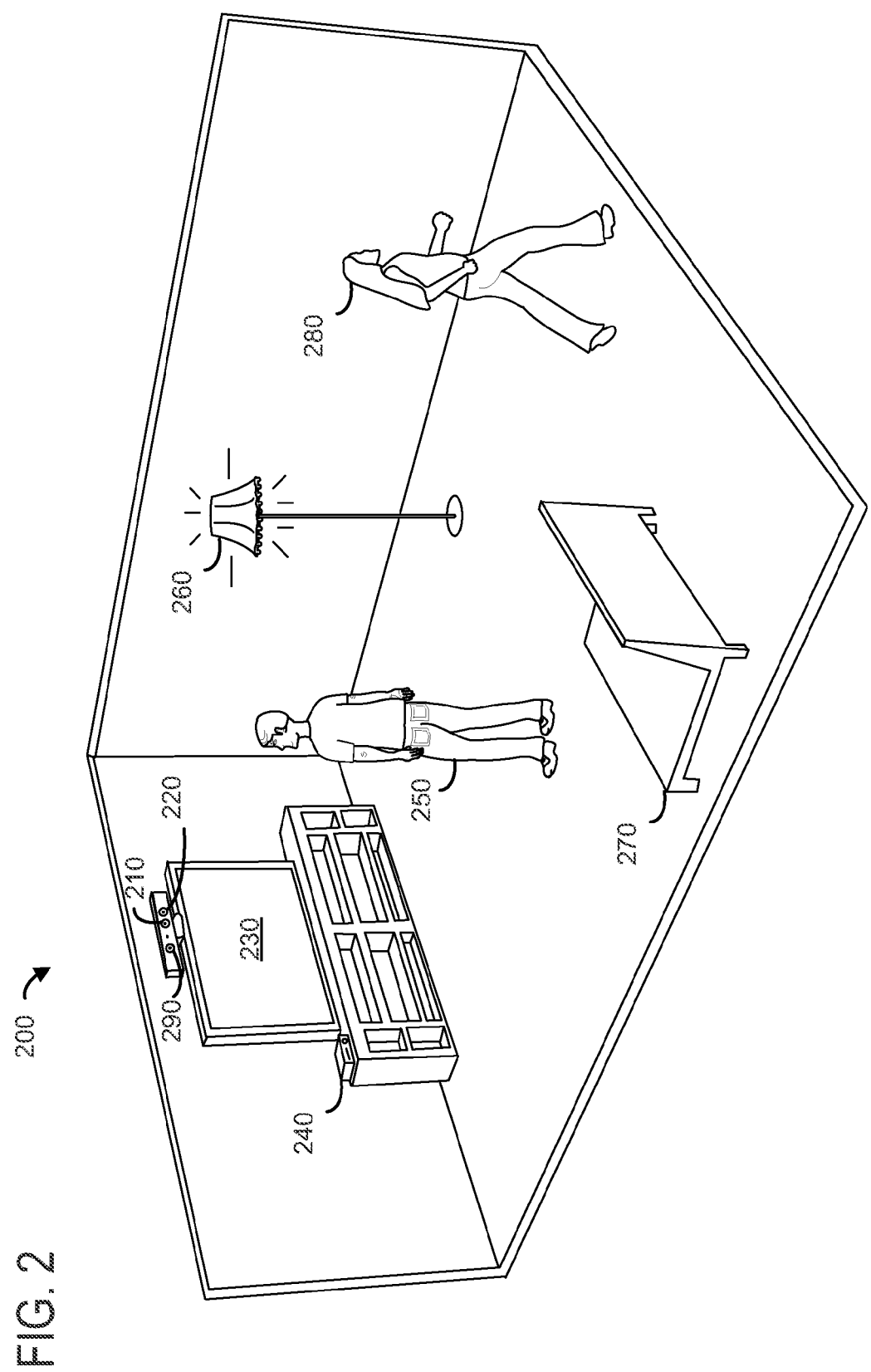
FIG. 2 shows an example environment for calculating an exposure setting in accordance with an embodiment of the present disclosure.

FIG. 2 shows an example environment 200 for calculating an exposure setting. In particular, FIG. 2 shows a gaming system 240, a primary image sensor 210, a test image sensor 220, a display device 230, an infrared light source 290 and a user 250. The environment 200 may further include an active light source 260, a couch 270, and a background person 280.

The display device 230 may be operatively connected to the gaming system 240 via a display output of the gaming system. For example, the gaming system may include an HDMI or other suitable display output. Likewise, the primary image sensor 210, test image sensor 220, and infrared light source 290 may be operatively connected to the gaming system 240 via one or more inputs. As a nonlimiting example, the gaming system 240 may include a universal serial bus to which a device including the image sensors may be connected. The image sensors and the gaming system 240 may be configured to wirelessly communicate with one another.

Gaming system 240 may be used to play a variety of different games, play one or more different media types, and/or control or manipulate non-game applications and/or operating systems.

In the illustrated embodiment, the test image sensor is used in a depth camera capable of generating depth maps, temperature maps, and otherwise observing and outputting infrared light information, as described above with reference to FIG. 1. The primary image sensor is used in a conventional RGB camera capable of observing visible light information to form a color image of a scene.

The image of the scene may be displayed on the display device 230, further processed, or sent to another device, for example. Exposure settings for the primary image sensor may be calculated using a previously sampled image.

Figure 3:
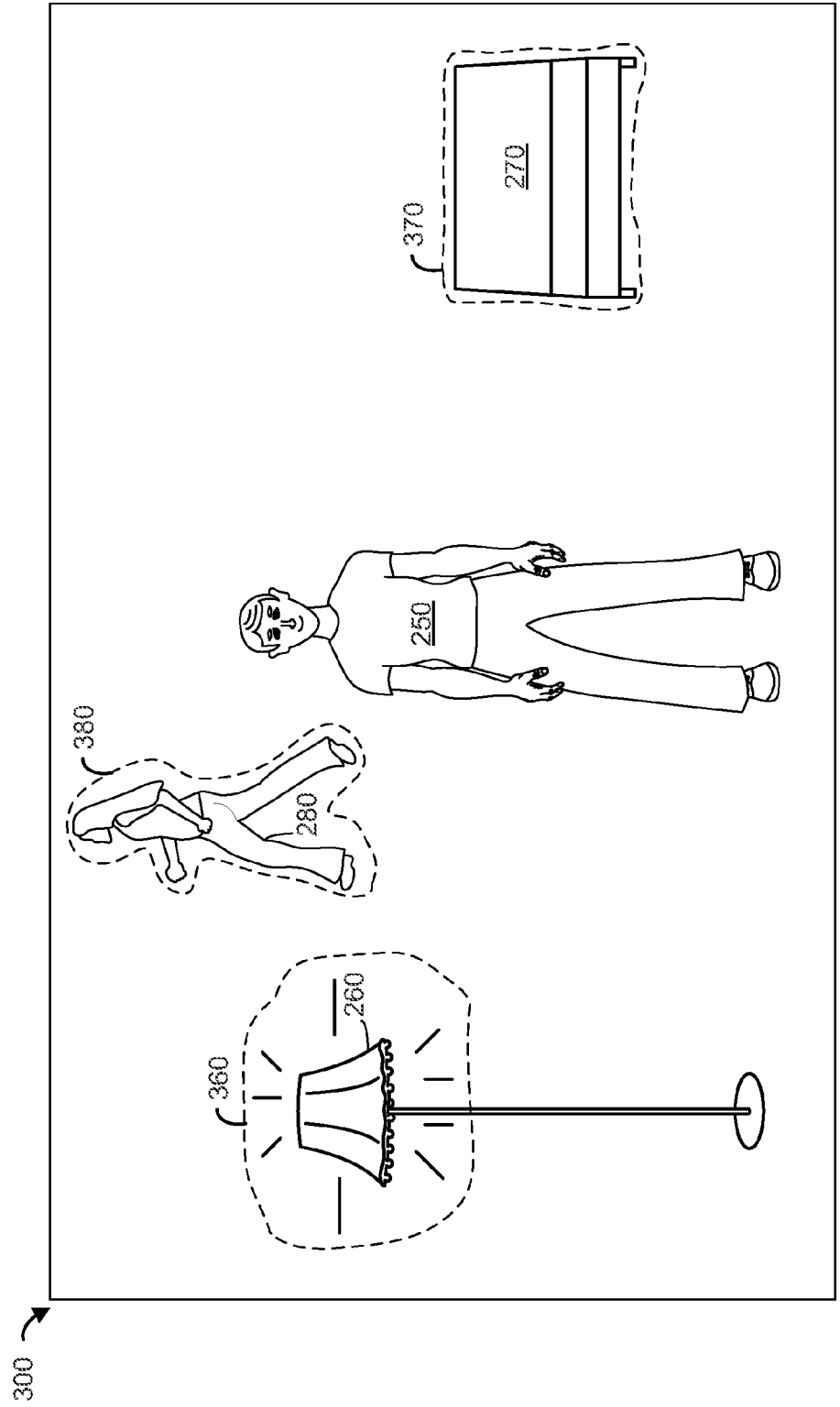
FIG. 3 shows a first-frame image of a scene in accordance with an embodiment of the present disclosure.

A simplified representation of an example first-frame image 300 is shown in FIG. 3. In particular, FIG. 3 shows example exclusion regions 360, 370, and 380. The pixels in the example exclusion regions 360, 370, and 380 image the active light source 260, couch 270 and background person 280, respectively. The example exclusion regions may be identified according to aspects of the method 100 of FIG. 1.

For example, exclusion region 380 includes pixels that image an object (e.g. the background person 280) not within a threshold tolerance of a reference depth. Exclusion region 370 includes pixels that image an object (e.g. the couch 270) not within a threshold tolerance of a reference surface temperature.

Exclusion region 360 includes pixels where the intensity of infrared light observed at that pixel while infrared light is being projected to that pixel is within a threshold tolerance of the intensity of infrared light observed at that pixel while infrared light is not being projected to that pixel. In other words, exclusion region 360 includes those pixels imaging the active light source 260.

A histogram of the first-frame matrix of pixels except the pixels imaging the one or more exclusion regions may be constructed. In the illustrated embodiment, the histogram does not include those pixels imaging the active light source 260, the couch 270, or the background person 280. Using the histogram, the exposure setting may be calculated and applied for subsequent matrices of pixels. As described above, this process may be repeated periodically.

In some embodiments, the above described methods and processes may be tied to a computing system including one or more computers. In particular, the methods and processes described herein may be implemented as a computer application, computer service, computer API, computer library, and/or other computer program product.

Figure 4:
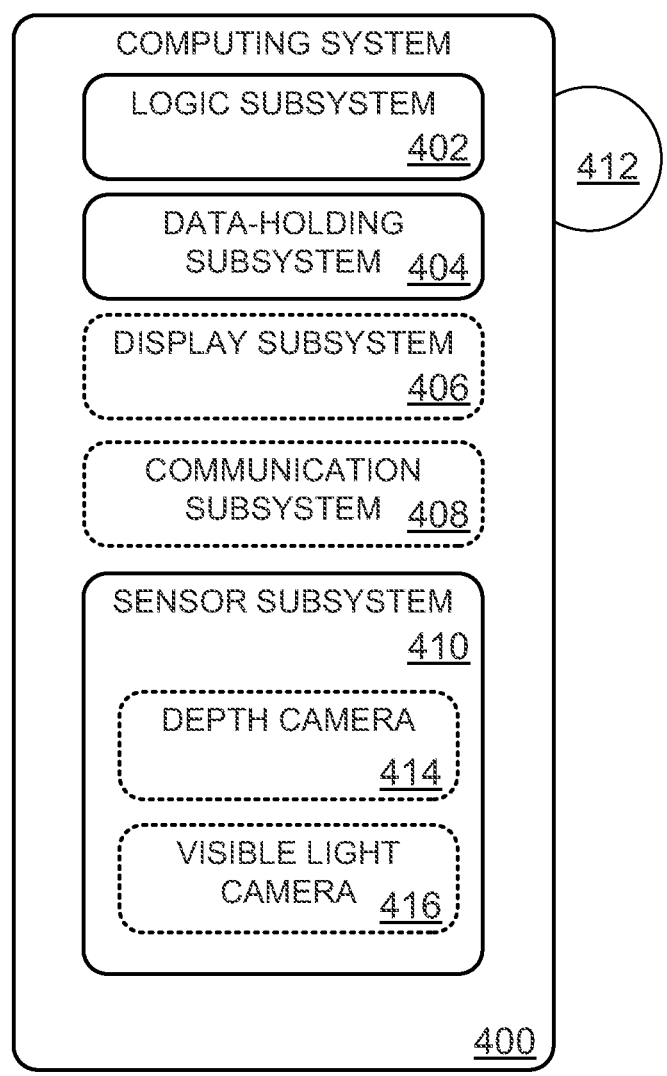
FIG. 4 schematically shows a computing system for performing the method of FIG. 1.

FIG. 4 schematically shows a nonlimiting computing system 400 that may perform one or more of the above described methods and processes. Computing system 400 is shown in simplified form. It is to be understood that virtually any computer architecture may be used without departing from the scope of this disclosure. In different embodiments, computing system 400 may take the form of a mainframe computer, server computer, desktop computer, laptop computer, tablet computer, home entertainment computer, network computing device, mobile computing device, mobile communication device, gaming device, etc. Gaming system 240 of FIG. 2 is a nonlimiting example of computing system 400.

Computing system 400 includes a logic subsystem 402 and a data-holding subsystem 404. Computing system 400 may optionally include a display subsystem 406, communication subsystem 408, sensor subsystem 410, and/or other components not shown in FIG. 4. Computing system 400 may also optionally include user input devices such as keyboards, mice, game controllers, microphones, and/or touch screens, for example.

Logic subsystem 402 may include one or more physical devices configured to execute one or more instructions. For example, the logic subsystem may be configured to execute one or more instructions that are part of one or more applications, services, programs, routines, libraries, objects, components, data structures, or other logical constructs. Such instructions may be implemented to perform a task, implement a data type, transform the state of one or more devices, or otherwise arrive at a desired result.

The logic subsystem may include one or more processors that are configured to execute software instructions. Additionally or alternatively, the logic subsystem may include one or more hardware or firmware logic machines configured to execute hardware or firmware instructions. Processors of the logic subsystem may be single core or multicore, and the programs executed thereon may be configured for parallel or distributed processing. The logic subsystem may optionally include individual components that are distributed throughout two or more devices, which may be remotely located and/or configured for coordinated processing. One or more aspects of the logic subsystem may be virtualized and executed by remotely accessible networked computing devices configured in a cloud computing configuration.

Data-holding subsystem 404 may include one or more physical, non-transitory, devices configured to hold data and/or instructions executable by the logic subsystem to implement the herein described methods and processes. When such methods and processes are implemented, the state of data-holding subsystem 404 may be transformed (e.g., to hold different data).

Data-holding subsystem 404 may include removable media and/or built-in devices. Data-holding subsystem 404 may include optical memory devices (e.g., CD, DVD, H-D-DVD, Blu-Ray Disc, etc.), semiconductor memory devices (e.g., RAM, EPROM, EEPROM, etc.) and/or magnetic memory devices (e.g., hard disk drive, floppy disk drive, tape drive, MRAM, etc.), among others. Data-holding subsystem 404 may include devices with one or more of the following characteristics: volatile, nonvolatile, dynamic, static, read/write, read-only, random access, sequential access, location addressable, file addressable, and content addressable. In some embodiments, logic subsystem 402 and data-holding subsystem 404 may be integrated into one or more common devices, such as an application specific integrated circuit or a system on a chip.

FIG. 4 also shows an aspect of the data-holding subsystem in the form of removable computer-readable storage media 412, which may be used to store and/or transfer data and/or instructions executable to implement the herein described methods and processes. Removable computer-readable storage media 412 may take the form of CDs, DVDs, HD-DVDs, Blu-Ray Discs, EEPROMs, and/or floppy disks, among others.

It is to be appreciated that data-holding subsystem 404 includes one or more physical, non-transitory devices. In contrast, in some embodiments aspects of the instructions described herein may be propagated in a transitory fashion by a pure signal (e.g., an electromagnetic signal, an optical signal, etc.) that is not held by a physical device for at least a finite duration. Furthermore, data and/or other forms of information pertaining to the present disclosure may be propagated by a pure signal.

When included, display subsystem 406 may be used to present a visual representation of data held by data-holding subsystem 404. As the herein described methods and processes change the data held by the data-holding subsystem, and thus transform the state of the data-holding subsystem, the state of display subsystem 406 may likewise be transformed to visually represent changes in the underlying data. Display subsystem 406 may include one or more display devices utilizing virtually any type of technology. Such display devices may be combined with logic subsystem 402 and/or data-holding subsystem 404 in a shared enclosure, or such display devices may be peripheral display devices.

When included, communication subsystem 408 may be configured to communicatively couple computing system 400 with one or more other computing devices. Communication subsystem 408 may include wired and/or wireless communication devices compatible with one or more different communication protocols. As nonlimiting examples, the communication subsystem may be configured for communication via a wireless telephone network, a wireless local area network, a wired local area network, a wireless wide area network, a wired wide area network, etc. In some embodiments, the communication subsystem may allow computing system 400 to send and/or receive messages to and/or from other devices via a network such as the Internet.

In some embodiments, sensor subsystem 410 may include a depth camera 414. Depth camera 414 may include left and right cameras of a stereoscopic vision system, for example. Time-resolved images from both cameras may be registered to each other and combined to yield depth-resolved video.

In other embodiments, depth camera 414 may be a structured light depth camera configured to project a structured infrared illumination comprising numerous, discrete features (e.g., lines or dots). Depth camera 414 may be configured to image the structured illumination reflected from a scene onto which the structured illumination is projected. Based on the spacings between adjacent features in the various regions of the imaged scene, a depth map of the scene may be constructed.

In other embodiments, depth camera 414 may be a time-of-flight camera configured to project a pulsed infrared illumination onto the scene. The depth camera may include two cameras configured to detect the pulsed illumination reflected from the scene. Both cameras may include an electronic shutter synchronized to the pulsed illumination, but the integration times for the cameras may differ, such that a pixel-resolved time-of-flight of the pulsed illumination, from the source to the scene and then to the cameras, is discernable from the relative amounts of light received in corresponding pixels of the two cameras.

In some embodiments, sensor subsystem 410 may include an visible light camera 416. Virtually any type of digital camera technology may be used without departing from the scope of this disclosure. As a nonlimiting example, visible light camera 416 may include a CCD image sensor.

It is to be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A method of calculating a gain setting for a primary image sensor, the method comprising:
   receiving a test matrix of pixels from a test image sensor;
   receiving a first-frame matrix of pixels from the primary image sensor; and
   calculating a gain setting for the primary image sensor using the first-frame matrix of pixels except those pixels imaging one or more exclusion regions identified from the test matrix of pixels.

2. The method of claim 1, where calculating a gain setting includes constructing a histogram of the first-frame matrix of pixels except the pixels imaging the one or more exclusion regions.

3. The method of claim 1, further comprising applying the calculated gain setting to the primary sensor for subsequent matrices of pixels.

4. The method of claim 1, where each pixel in the first-frame matrix includes visible light information indicating an intensity of visible light observed at that pixel.

5. The method of claim 1, where each pixel in the test matrix includes infrared light information indicating an intensity of infrared light observed at that pixel.

6. The method of claim 5, further comprising finding a depth of an object observed at each pixel, wherein the exclusion regions include a subset of pixels that image an object not within a threshold tolerance of a reference depth.

7. The method of claim 5, further comprising finding a surface temperature of an object observed at each pixel, wherein the exclusion regions include a subset of pixels that image an object not within a threshold tolerance of a reference surface temperature.

8. The method of claim 5, further comprising comparing a first matrix of pixels indicating an intensity of infrared light observed at a pixel while infrared light is being projected to that pixel and a second matrix of pixels indicating an intensity of infrared light observed at that pixel while infrared light is not being projected to that pixel, wherein the exclusion regions include that pixel if the intensity of infrared light observed at that pixel while infrared light is being projected to that pixel is within a threshold tolerance of the intensity of infrared light observed at that pixel while infrared light is not being projected to that pixel.

9. A data-holding subsystem holding instructions executable by a logic subsystem to:
   receive a test matrix of pixels from a test image sensor;
   identify one or more exclusion regions imaged by a subset of the test matrix of pixels;
   receive a first-frame matrix of pixels from the primary image sensor; and
   calculate an exposure setting for the primary image sensor using the first-frame matrix of pixels except those pixels imaging the one or more exclusion regions.

10. The data-holding subsystem of claim 9, where the exposure setting is a gain setting.

11. The data-holding subsystem of claim 9, where calculating an exposure setting includes constructing a histogram of the first-frame matrix of pixels except the pixels imaging the one or more exclusion regions.

12. The data-holding subsystem of claim 9, where the calculated exposure setting is applied to the primary sensor for subsequent matrices of pixels.

13. The data-holding subsystem of claim 9, where each pixel in the first-frame matrix includes visible light information indicating an intensity of visible light observed at that pixel.

14. The data-holding subsystem of claim 9, where each pixel in the test matrix includes infrared light information indicating an intensity of infrared light observed at that pixel.

15. The data-holding subsystem of claim 14, further holding instructions executable by the logic subsystem to:
   find a depth of an object observed at each pixel, wherein the exclusion regions include a subset of pixels that image an object not within a threshold tolerance of a reference depth.

16. The data-holding subsystem of claim 14, further holding instructions executable by the logic subsystem to:

find a surface temperature of an object observed at each pixel, wherein the exclusion regions include a subset of pixels that image an object not within a threshold tolerance of a reference surface temperature.

17. The data-holding subsystem of claim 14, further holding instructions executable by the logic subsystem to:

compare a first matrix of pixels indicating an intensity of infrared light observed at a pixel while infrared light is being projected to that pixel and a second matrix of pixels indicating an intensity of infrared light observed at that pixel while infrared light is not being projected to that pixel, wherein the exclusion regions include that pixel if the intensity of infrared light observed at that pixel while infrared light is being projected to that pixel is within a threshold tolerance of the intensity of infrared light observed at that pixel while infrared light is not being projected to that pixel.

18. A method of calculating a gain setting for a visible light image sensor, the method comprising:

receiving a test matrix of pixels from an infrared image sensor;

identifying one or more exclusion regions imaged by a subset of the test matrix of pixels;

receiving a first-frame matrix of visible light pixels from the visible light image sensor; and calculating a gain setting for the visible light image sensor using the first-frame matrix of visible light pixels except those pixels imaging the one or more exclusion regions.

19. The method of claim 18, further comprising applying the calculated gain setting to the primary sensor for subsequent matrices of pixels.

20. The method of claim 18, where calculating a gain setting includes constructing a histogram of the first-frame matrix of pixels except the pixels imaging the one or more exclusion regions.

\* \* \* \* \*